Oct. 13, 1942.  D. H. WELLS  2,298,321
FILTER
Filed Nov. 4, 1937   2 Sheets-Sheet 1
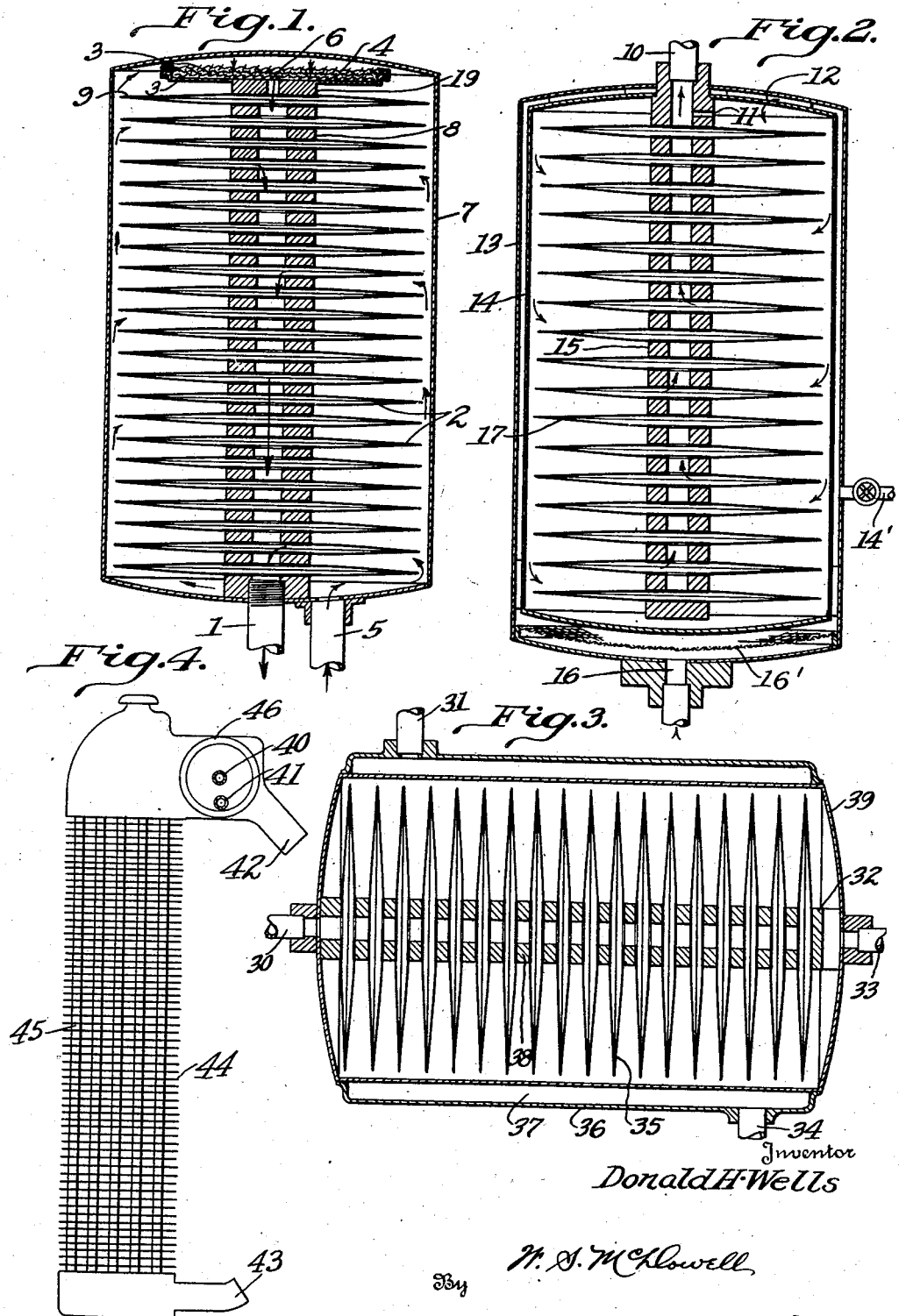
Inventor
Donald H. Wells Oct. 13, 1942.  D. H. WELLS  2,298,321
FILTER
Filed Nov. 4, 1937  2 Sheets-Sheet 2
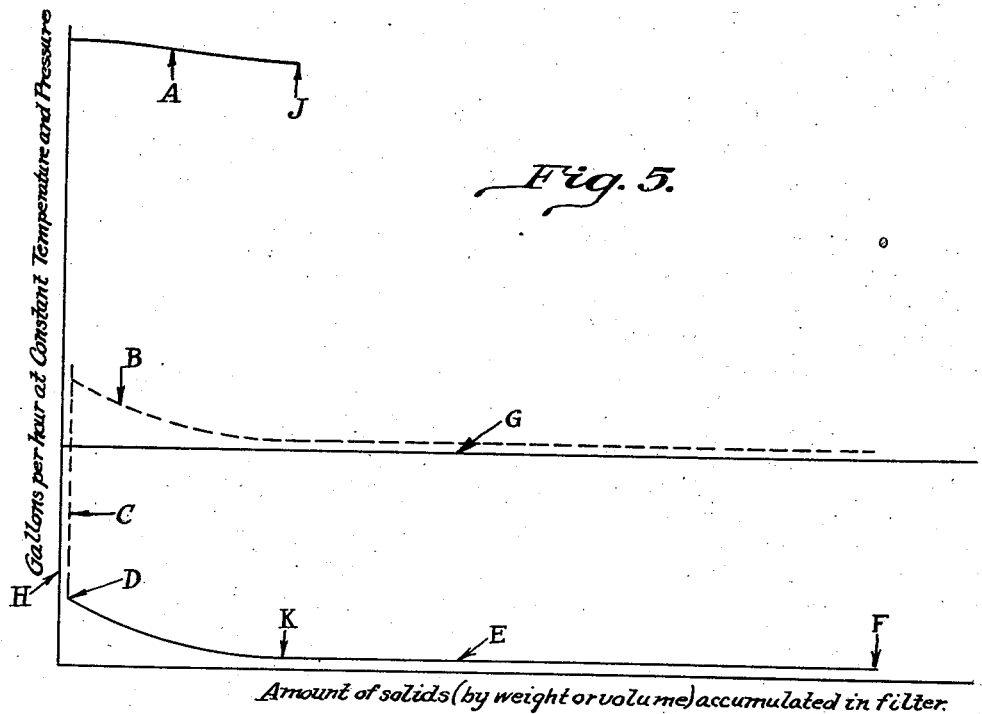
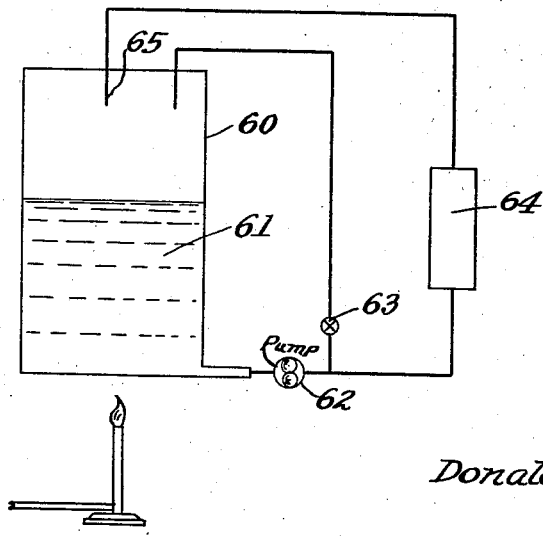
Inventor
Donald H. Wells
By
Attorney Patented Oct. 13, 1942

2,298,321

UNITED STATES PATENT OFFICE 2,298,321

FILTER

Donald H. Wells, Glen Ellyn, Ill.

Application November 4, 1937, Serial No. 172,812

2 Claims. (Cl. 210—150.5)

This invention relates to the art of filtering liquids to effect the removal of solids therefrom and has especial reference to the provision of an improved and effective oil filter which is practical for and efficient in use when attached to an automobile, tractor, truck, airplane, stationary or Diesel engine.

Among the objects of this invention are the following:

The provision of novel methods of heating the oil in a filter having a filter medium by which solids which discolor and are deleterious to the oil are removed or separated by a single pass of the oil through the filter medium and wherein the filter is adapted for attachment to an internal combustion engine;

A filter that will remove solids, including commonly called colloidal carbon, from used crankcase oil passed therethrough, and remove them from the engine faster than so-called "filters" or strainers of the prior art;

A filter which will permit substantially full engine pressure to be carried on the inlet side of the filter medium, and substantially zero pressure on the outlet side of the filter medium, for substantially the full life of the filter, that is, from practically the time it is new until the filter container is substantially filled with filter cake; and will keep the engine oil in a clean condition during the useful life of the filter;

A filter which will continue to efficiently function when the tight cake composed of all the different sized particles in ordinary crankcase oil has deposited on the filter medium. By this, I mean that the filter continues to function by filtering the oil through the cake deposited on the filter medium, and does not stop filtering as soon as such a cake is formed;

To keep the oil in the crankcase cleaner during at least seventy-five (75%) per cent. of the full life of the filter than has been possible with "filters" of prior art of equal size;

To provide a filter which not only is more efficient but needs to be replaced less frequently than "filters" of prior art of equal size;

A filter in which solids removed from the oil may be more tightly packed than in "filters" of prior design;

A filter which will hold upwards to 4.7 times as much dirt as will the best "filters" of prior art of equal size that will also give color filtration;

To provide a filter that will, when operating on a by-pass and when 20% filled with solids, remove solids including colloidal carbon from the crankcase oil in the system in which the filter is placed from six to ten times faster than the most efficient "filters" of prior art of equal size and with an equal weight of the same solids deposited therein.

A filter that will not unload the solids deposited therein when the pressure is varied, as when starting the motor or when changing the oil;

To use, in connection with a filter with a true single-pass filter medium, the heat contained in either the warm oil of the crankcase or the liquid coolant of the motor for filtering purposes;

Provision of using heat for filtering purposes, which will be inexpensive and readily obtainable;

To remove solids in crankcase oil which would otherwise abrade and wear the moving parts or agglomerate to stop up oil passages causing engine failures;

To extend the useful life of the engine oil, saving the owner time and money and conserving natural resources;

To make a filter that can be employed for a predetermined time before replacement is necessary, still keeping the oil in the crankcase under average use in a substantially visibly clean condition, and enabling solids to be packed into it to the consistency of thick putty;

Provision of a filter with a controlled flow rate so that it will not pass so much oil when new that it will starve the engine, and still will pass a sufficient quantity up to the time it is completely packed with dirt to keep the viscosity of the oil low for filtration through a true filter medium;

To extend the useful period of life of a filter attached to the lubricating system of an internal combustion engine so that the filter will continue to function in a useful manner after a cake has formed on the entire surface of the filter medium, a cake which normally would retard the flow of oil through the filter to such an extent that, were no means for overcoming this provided, the cold oil in the filter would not be replaced with or warmed by the warm oil in the crankcase so that filtration could efficiently begin when the motor was started. In other words, it is an object to prevent the oil from laying practically dormant in the filter when the motor is started, after that filter has become only partially filled with solids;

A provision of heating the oil in a filter attached to an internal combustion engine fast enough to allow the filter to function efficiently in automotive service with stop and go driving, yet never heating the oil so severely as to cause oxidation and sludging or coking of the oil;

One of the outstanding objects of the invention resides in the provision of a novel by-pass orifice or constant "bleed" port within a filter made with an efficient filter medium, so that when the filter assembly and by-pass orifice are properly placed in a fluid-tight shell, the filter medium will function to remove fine solids from the liquids being filtered thus effecting a cake on the surfaces of the medium, and the by-pass orifice or "bleed" will function to allow a small stream of warm unfiltered oil to pass through the filter to keep it virtually at the temperature of the oil in the crankcase and without substantially reducing the pressure on the inlet side of the filter medium.

The present application constitutes a continuation-in-part of my prior co-pending application Serial No. 91,925, filed July 22, 1936.

For a further understanding of the invention, reference is to be had to the following description and the accompanying drawings in which:

Fig. 1 is a longitudinal view taken through a filter constructed in accordance with the present invention and wherein the orifice is protected from stoppage during use by means of a "strainer" leaf;

Fig. 2 is a longitudinal view taken through a filter wherein a double shell is shown;

Fig. 3 is a longitudinal view taken through a filter equipped with a jacket through which is circulated a liquid coolant;

Fig. 4 is an end view taken of a filter mounted within the reservoir of a radiator;

Fig. 5 is a diagram representing oil flow rates through the filter;

Fig. 6 is a similar view of a filter in an oiling system.

It is known that the solids in crankcase oil consist of sand, metal, metal oxides, and carbon. The carbon, which usually composes about 75% of the total solids, may be coarse or fine and of varying degrees of hardness. Coarse carbon results from particles falling from the underside of the piston or from agglomeration of the colloidal carbon. Gums and asphaltines will sometimes tend to hold the fine carbon particles together, and it is not uncommon to find engine oil ducts completely stopped with fine particles of carbon.

Colloidal carbon frequently has different meanings. It is defined here as those minute carbon particles which, when present in new or used motor oil in quantities, cause the oil to appear black when spread on a piece of steel or glass; but which may be filtered out with filter paper of fine porosity after a slight cake has formed so that the filtrate will appear clean. If used oil is diluted with nine parts of naphtha and centrifuged, the colloidal carbon will be deposited in the bottom of the container. If a barrel of average used oil is allowed to settle for a year without being disturbed, the upper fifty per cent. of that oil will be free from colloidal carbon, as the word is used here, but the lower thirty per cent. will contain colloidal carbon and abrasives of equal size still in suspension.

Removal of carbon is desirable because: (1) some of its forms are hard, (2) it tends to collect from centrifugal action in the crank shaft and with gums to stop oil passages, and (3) it and its accompanying asphaltines and the like tend to form emulsions with water, carrying the water with any traces of inorganic acids that may be contained therein to the moving parts of the motor to cause corrosion. Without emulsification, water will ordinarily lie in the bottom of the crankcase where it can do no harm.

Removal of colloidal carbon is also desirable because, if a "filter" is provided which does not remove it, that "filter" cannot remove those particles of sand and metal or metal oxides which are just as fine as colloidal carbon and which will also abrade the motor. A practical reason for removal of carbon is that the operator of an internal combustion engine can see if the oil is clean when the colloidal carbon is removed. If it is not removed, the oil looks black and dirty and no one can tell how abrasive it is without an analysis, and even then, a practical determination is difficult.

The well-known cotton waste "filter" will remove colloidal carbon but its life is limited. This is not a true filter as most of the solids are not removed in one pass, the filtrate testing usually 1.8% solids or more if the feed oil tests 2%. The cotton waste "filter" in reality is a settler in which the oil is allowed to pass through a container, and the waste interior prevents convection currents, permitting the solids to settle on the fine fibers of the waste as the oil passes around them. The solids cannot be packed in the waste to the consistency of putty because any oil passing the waste under pressure washes off the solids already deposited and prevents others from settling thereon. The pressure is of necessity reduced by an orifice suitably placed in the inlet or outlet of the filter to cut down the rate of flow to allow settling and prevent starving the engine, because the waste is so openly porous. The rate of flow through a waste type "filter" is slow enough to allow settling but is many times the rate of flow through a filter of the same size made with the largest area possible of true filter medium, without a bypassing orifice. In industrial but non-vehicular uses a filter is usually equipped with a filter medium which removes in one pass at least 90% and usually over 98% of the solids in the liquid being filtered, and if the device does not accomplish this, it is known as a strainer or a screen. In my invention is embodied the first true filter which is practical for use when attached to an internal combustion engine.

If a disk type filter made from the most open-pored paper and resin impregnated, in accordance with my co-pending application, Serial No. 91,925, containing four square feet of area is placed in a system whereby S. A. E. No. 30 oil containing solids from drained crankcase oil can be forced therethrough at forty pounds per square inch pressure at a temperature of 160° F., the flow for instance will vary as follows: At first, before the cake "catches" on the filter medium, the rate of flow will be many gallons per hour, the filtrate dirty, and the pressure on the inlet side of the filter medium will be low and about the same as the pressure on the outlet side of the filter medium unless special provision is made to take care of the enormous flow. However, as soon as the cake "catches" (and it will do so immediately if a "filteraid," such as Kieselguhr is added to hold it) the flow drops off to a few gallons per hour, the filtrate becomes brilliant, usually containing less than 0.1% or even 0.02% solids although the feed may contain 2%, and the pressure on the inlet side of the filter medium raises to practically that of the system, and the pressure on the outlet side of the filter medium drops to almost zero, when proper piping is used. In practice, filter media that will "catch" the cake quickly without the use of any "filteraid" is used herein.

The "catching" of the cake as determined by (1) flow rate, (2) brilliancy of filtrate, and (3) pressure within the filter is positive. A "true" filter medium, as used in this specification, means one that will "catch" the cake when filtering used lubricating oil and will then remove more than 90% of the solids in one pass. Practically the only "solids" that pass such a filter medium with the initial "caught" cake, are those oxidized products which are soluble in hot oil, but are precipitated out when the oil is colled and diluted with naphtha for centrifuging.

Even a new rate of flow of a few gallons per hour is not sufficient to maintain the temperature in the filter at near that of the oil in the crankcase because of radiation of heat from the filter.

Behavior of so-called "filters" of prior art compared to my true filter may be more easily explained by referring to Fig. 5. In this view, the ordinate represents the gallons of flow at a constant temperature and pressure, and the abscissa represents the amount of solids, based either on weight or volume, accumulated in the filter during use.

Curve K represents the flow of oil through a true filter medium, such as may result by forcing an S. A. E. No. 30 oil through four square feet of true filter medium at 160° F. and 40 pounds per square inch pressure. The invention is not limited in any way to the area of the filter medium used. The cake is much more dense than the filter medium, and therefore the rate as shown as "C" will be much higher than the rate as soon as the cake catches as shown at D. How high the rate begins will therefore depend upon the selection of the filter medium. For best results, a filter medium should be selected which "catches" the cake in less than 200 miles of operation when attached to an automobile, although still more openly porous filter media probably can be used. As soon as the cake catches, the rate begins to fall, rapidly at first and slower later, as solids accumulate in the filter. It will be noted that the drop in flow rate between K and F is much less than between D and K.

To further illustrate the curves in Fig. 5, a test run with apparatus indicated in Fig. 6 may be used. In Fig. 6, the container 60 is partially filled with new oil which is maintained at 160° F. The filter 64 is one with an openly porous filter medium of area desired for the test, so openly porous that a high rate of flow is obtained at first.

Oil 61 is forced through the filter 64 by means of a pump 62. With this specially selected open filter medium, the rate of flow at first will be many gallons per hour and the filter 64 will be maintained at practically the same temperature as the oil 61 in container 60. Then continually add to the circulating oil some diatomaceous earth, activated carbon, or any kind of solids which will slow the rate of flow through the filter. As this rate drops, the filter remains hot until a point is reached where heat from the incoming oil ceases to be enough to replace all of that lost from radiation. At this point there begins a cycle when the cooling filter causes higher viscosities of oil therein, which causes still lower rates of flow, which causes a cooler filter and higher viscosities and so on until the filter cools rapidly and the rate of flow falls precipitously. The rate of flow at which this cycle begins is called the critical flow rate, and is represented approximately at the point H in Fig. 5. In other words, to maintain a temperature suitable for filtering in an unheated filter, a flow approximately as high or higher than that represented at H is required.

It will be noted that with S. A. E. No. 30 oil and 40 pound per square inch pressure, the flow through a true filter medium as soon as the cake has caught, even at 160° F. is below the point H or will rapidly fall below this point as cake accumulates in the filter. I am referring to areas in the neighborhood of 4 square feet which are about the practical maximum for a 70 cubic inch filter, the size generally accepted by the automobile manufacturers.

Add to this effect that of stopping the motor and allowing the oil in the filter to become cold. The viscosity of an S. A. E. No. 30 oil might be the following:

|  | Pennsylvania oils | Other oils |
|---|---|---|
|  | Seconds | Seconds |
| Saybolt Universal viscosity at 160° F | 113 | 120 |
| Saybolt Universal viscosity at 70° F | 1,220 | 2,050 |
| Saybolt Universal viscosity at 0° F | 50,000 | 220,000 |

It will be noted that at 70° F. oil is about 11 to 17 times higher in viscosity (thicker) than at 160° F. and at zero it is from 443 to more than 1800 times higher in viscosity than at 160° F. It is no wonder that if no means is provided for heating the oil, it will lie practically dormant or stagnant in a filter made with a true one-pass filter medium, although that filter has less than 5% of its space filled with cake. In other words such a filter becomes inactive almost immediately because of the combined effects of (1) dirt accumulation, (2) dropping of temperature due to radiation and (3) dropping of temperature due to stopping the motor.

In general "filters" of prior art have circumvented this difficulty by using open pored or open weave filter media so that all the dirt is not removed in one pass and both dirt and oil are forced through the filter medium to allow circulation. As stated above, the waste-type "filter" is an example of this and the percentage of solids in the feed and the filtrate does not vary much. Canton flannel used extensively in an 8 oz. weight is very similar and the feed testing for instance 2% dirt will usually show a filtrate in one-pass testing not less than 1.6% or 1.4% even if the pressure is reduced with an orifice in the inlet of the filter to slow the flow or velocity of the oil through the filter medium so the solids will settle thereon. If the pressure is suddenly raised, the filtrate may test higher in dirt content than the feed. By using such open-pored filter media, these so-called "filters" become really nothing more than strainers or settlers wherein the dirt may be deposited because of the slow velocity of oil in the "filter," and none of the advantages of true or brilliant filtration are secured in them.

In the preferred form of my invention, a small stream of unfiltered oil is continuously and always returned to the engine. The amount returned may vary considerably, depending upon the size piping and the oil pump capacity of the system to which my invention is attached. Referring again to Fig. 5, the total amount of oil passing through my filter with a constant "bleed" will be represented by the dotted line B. The flows of B are totals of K and G, the latter being approximately the constant flow through the orifice in the filter. I may use higher or lower flows than this and not depart from the spirit of the invention. These two streams accomplish the following results. The larger stream, represented at G through the orifice, keeps the flow above the critical flow rate H and the filter warm. The smaller stream K through the filter medium keeps the oil clean.

Waste type "filters" are so openly porous that probably more than 20 times the flow represented by B would pass through them and the engines to which they were attached would "starve" if the flow were not limited by means of an orifice (either as such or in the form of small lines) in either the inlet or outlet lines. With an orifice in the feed or outlet lines, the flow through a waste type "filter" may be represented at A, which is several times higher than necessary to keep the oil in the filter warm, but is not enough to starve the engine. As stated above the limiting factor of this flow is the size of the orifice in the inlet or outlet line of the waste "filter."

The quality of a filter is determined by the two factors (1) how fast it removes dirt and (2) how much dirt it will hold before the dirt-removing rate falls below that required to keep the oil clean in appearance.

My invention is largely dependent upon the fact that a small by-pass stream of efficiently filtered oil will keep the oil in the crankcase much cleaner than will a large stream of inefficiently "filtered" oil. The effectiveness of my method may be conceived when one realizes that every quart of oil truly filtered on a by-pass method gives the same results as draining a quart of used oil and adding a quart of new oil to the motor, from a dirt content standpoint.

With my invention, the dirt removing rate at F, Fig. 5, is higher than that required to keep the oil in a clean appearance in the average automobile and should be as high or higher than J for the most efficient waste type "filter" of prior art, although at F, my filter had accumulated several times the amount of solids accumulated by the waste type "filter" at J. The point at which the dirt-removing rate of a canton flannel "filter" falls below that required to keep the oil in the average automobile in a clean appearance, will be reached long before even than with the waste type "filter," as computed by the amount of solids contained in the filter.

In my invention, a true filter medium producing a brilliant filtrate not only "catches" the cake, including colloidal carbon, but holds it against pressures of 50 pounds per square inch or more, depending upon the pressures within the engine system. This accounts for the fact that I can condense the cake to the consistency of putty in my filter, before replacement is necessary, and is a point of difference between a true filter and strainers of prior art.

A number of conditions favor filtration. Cake from crankcase oil should not be classified as "compressible," and the rate of flow through it, when held on a true filter medium, will vary almost directly as the pressure. The rate of flow incidentally is determined not by the pores of the filter medium but by the density or porosity of the cake. The more pressure that can be used, the faster will be the rate of flow and the dirt-removing rate. Temperature aids filtration by reducing viscosity, as noted above. Removal of all solids in one pass, as discussed in my prior application Serial No. 91,925 of which this is a continuation-in-part, improves the dirt removing rate.

In my invention, advantages have been taken of:

Removing the dirt in one pass through the filter medium.

Using substantially full engine pressure on the inlet side of the filter medium and zero pressure on the outlet side during substantially the full life of the filter.

Bringing the oil up to temperature as quickly as possible to reduce viscosity, and still not allowing the oil to overheat in the filter on long runs on hot days.

It is known that filters have been described in the prior art as heated with exhaust gases, but these have never reached much commercial success because if sufficient gases are used to heat the oil in wintry weather, the oil gets so hot on long summer runs that it oxidizes or cracks, causing much more damage than the filter could ever hope to overcome or offset. The reason for this is that the specific heat of exhaust gases is low and their temperature frequently exceed 700 to 1000° F.

The filter shown in Fig. 1 consists of a liquid-tight shell 7 containing inlet opening 5 and outlet 1. The filter medium 2, which is a "true filter medium" and is preferably made in leaf form of paper disks, sealed at the periphery and impregnated with materials as described in my prior application Serial No. 91,925. However, other shapes of filter media, and filter media of other material may be used without departing from the spirit of the invention, so long as the filter media selected have a pore size small enough so that the cake will be "caught" early in the life of the filter. The leaves are cemented to the spacers 8 so that, were it not for the orifice 6, the only way that oil entering the filter through the inlet 5 could leave the filter through 1 would be to pass through the true filter medium 2. However, the spacer adjacent leaf 9 is bored with a drill approximately .043 inch in diameter, making the orifice shown at 6. The leaf shown above the orifice-bearing spacer (the end leaf), is made by spacing two open mesh cloth or screen disks 3 with one or two drainage screens 4 (one is shown in the drawings). This leaf functions to strain the oil passing through the orifice 6 so that the latter will not become stopped up. The disks 3 are made of open weave material so that they will not "catch" colloidal carbon or other small material to form a tight cake which in turn would prevent this leaf from passing as much oil as the orifice 6 would carry.

In operation, the filter is connected to the lubricating system of an internal combustion engine so that oil under full engine pressure will enter inlet 5. This pressure may be produced by the regular oil pump in the engine, or by any suitable means, the higher pressure being preferable. One quarter inch outside diameter tubing is usually large enough for both inlet and outlet connections, although larger tubing may be used if desired. Part of the oil entering 5 is forced through the true filter medium 2 at practically full engine pressure while the rest passes through the end strainer leaf and orifice 6. As soon as a cake is formed on the filter medium (as soon as it "catches") the cake itself restricts the flow of oil through it so that only a small portion of oil passing through the filter passes through the cake and filter medium and the largest portion passes through the orifice. The oil leaving the filter through outlet 1 is returned either directly to the crankcase of the engine or to moving parts requiring lubrication. For best filter efficiency, there should be practically no back-pressure in the outlet 1.

The shape of the constant bleed orifice 6 is not important and it may be round, square, slit-shape, or it may be located in a different position, such as in the seat of a relief valve of the filter; the only requirement being that it shall allow a small stream of oil to constantly "bleed" through the filter without being filtered and without materially reducing the pressure on the inlet side of the filter medium. (Oil through the orifice may be strained). Therefore the size is important and must be correlated with the size piping used to and from the filter, and the amount of oil required to warm the filter quickly and allow the filter medium to efficiently function. As the cost of tubing and fittings are important because of volume productions of automobiles, tractors, etc., manufacturers desire to use the smallest tubing and fittings that will be satisfactory. For this reason the smallest orifice that can be used which will not become stopped up and which will pass enough oil to heat the filter almost as quickly as the oil in the crankcase is heated is best. When using short ¼ inch O. D. tubing, an orifice from .035" to .045" diameter is usually satisfactory, although variations from these figures may be used, especially if larger tubing is used. Orifices in the order of .065" pass so much oil that they reduce the pressure on the inlet side of the filter medium and reduce the efficiency of the filter unless inlet and outlet lines with plenty of capacity are used.

A similar filter is shown in Fig. 2 with the exception that the orifice 11 is unprotected by a strainer leaf. The outside shell 13 is of substantial construction to hold the pressures of the oil in the filter, and contained within it is the inside shell 14 which is not liquid-tight. The oil enters through the inlet 16, passes between shells 13 and 14 to the opening in shell 14 at 12. Oil entering shell 14 through this opening is divided into two parts, part of it passing through the leaves 17 and the larger part, after the cake has "caught" on the true filter medium, passing through the orifice 11. Again orifice 11 is small enough to prevent much loss of pressure on the inlet side of the filter medium and increase of back pressure on the outlet side of the filter medium within practical limits; and large enough to keep the filter up to temperature.

Shell 14 serves to hold either water or solids that have settled out, and prevent them from getting into the oil stream. Shell 14 may be entirely eliminated, and in fact, is seldom necessary; or it may be inserted in the construction shown in Fig. 1. Either filter may be inverted or mounted in a horizontal position. Other means of screening the oil going through the orifice may be used than that shown in filter in Fig. 1. For instance a screen 16' may be placed over the inlet opening of the filter so that all the oil entering the filter will be strained to remove lint or anything which might have a tendency to plug the orifice. Or orifice 11 in Fig. 2 could be covered with a screen. And without departing from the spirit of the invention, a separate opening in the filter shell with a small separate line 14' returning to the crankcase or to a moving part requiring lubrication, could carry the oil from the filter unfiltered, so that oil in the filter would be replaced with warm oil from the crankcase. A separate line is not necessary as the unfiltered oil can be returned through the one line with the filtrate just as easily as not, saving the cost of the third line.

In Fig. 1, the inlet and orifice are preferably in opposite ends of the filter to provide a better circulation of oil through the filter than would be obtained if both were placed in the same end. The inlet preferably should be on the bottom and the orifice on top if the filter is to be mounted vertically on the engine. If filter in Fig. 2 is to be mounted horizontally, the opening 12 should preferably be on the upper side.

The inner container 14 could have part of its wall or end, or in fact all of both ends and side walls made of perforated plate, with openings smaller than the orifice 11, or of a screen. While screening of the oil passing through the orifice may be used, in many instances it is not necessary, and a screen in such cases need not be provided.

This invention, involving the use of a bleed orifice, is particularly adapted for use in a filter with a "true" filter medium, of which porous wood or rag pulp in sheet, molded or other form, impregnated with a polymerized resinoid such as Bakelite is preferred. However, the filter medium is not limited to one of fibrous nature, and the fixed area, constant bleed or by-pass may be used with filter media made of rattan, fuller's earth, porcelain, wood, cloth or in fact with any material which gives true filtration. When using so-called "filter" media that do not remove all the solids in one pass or that do not form a cake, the advantages of the use of a bleed orifice are diminished because there is a large flow of oil at all times during the useful life of the "filter" through the "filter" medium and this large flow keeps the filter warm. I refer particularly to the cotton waste type "filter." In contrast to the cotton waste type "filter," if the filter is made with a true filter medium that removes practically all the solids in one pass and forms the dense cake of solids in used crankcase oil, the orifice bleed is not only advantageous but also necessary if one is to secure more than about 5% of the possible life of the filter (unless one uses the other method of heating described below).

If an orifice is placed in feed inlet 5 or 16, it serves the purpose of cutting down the amount of oil that will pass through the "filter" when the oil is hot or cold, when the filter is new or old, so that at no time would the filter remove so much oil from the lubricating high pressure system of the engine that it would starve the bearings and cause undue drop in pressure. For these purposes the orifice in the feed line is very useful. An orifice in the outlet line would have the same results from the standpoint of limiting the maximum flow.

But these orifices do not give the desired results from a filtering standpoint. They control the flow of oil through the filter but this control is obtained at the expense of pressure on the filter medium. When the orifice is in the feed line and the "filter" is equipped with a very porous or strainer medium like cotton waste or 8 ounce canton flannel, the actual pressure differential, when the filter is operating in a manner that will remove dirt fast enough to keep the crankcase oil in the average engine in a clean-appearing condition, measured as difference in pressure on the inlet and outlet side of the filter medium is very small. That is what is necessary with these strainer media to prevent passing too much oil through them. The size of the orifices used in the waste and canton flannel feed lines is much larger than the orifice I use within the filter, in ordinary practice.

The use of a constant bleed orifice with a "true" filter medium is the preferred form of my invention from the standpoint of cost of manufacture, and it is particularly efficient.

Another object of my invention is to surround the filter with the liquid used as engine coolant, for purposes of heating the oil in the filter to maintain filtering viscosities. The coolant may be circulated through a jacket surrounding the filter proper, or the filter may be mounted within a chamber containing the liquid coolant, such as in the reservoir of the radiator.

In Fig. 3, the filter medium is shown in the form of filter leaves 35 mounted with spacers 38 to form a filter assembly, which in turn is mounted in the shell 39 in such a manner that when liquid to be filtered is introduced under pressure into the shell 39 through inlet 33, it must be forced through the filter medium before it can leave the filter through outlet 30 as filtrate. There need be and preferably is no orifice in this type of filter. The oil entering the filter 33 may come from the engine pump, or from a separate pump, operating on a by-pass system so that the filtrate from outlet 30 is returned to the engine crankcase or to bearings requiring a small amount of oil for lubrication.

The coolant jacket, referred hereto as "water-jacket" may be located on the walls of the container as shown in the drawing at 37, or it may entirely surround the inner filter shell 39, as desired. Water may be circulated through the jacket 37 by connecting lines to an opening for instance on the suction side of the water pump from either 34 or 31 opening, and connecting another line from the other jacket opening (34 or 31 as the case may be) to a point where hot water from the engine will be circulated to the jacket 36. The hot water connection might easily be from the cylinder head hot water compartment.

During operation of the motor, water is circulated through the jacket 37 by means of the pump (or by thermo-siphon if the motor is not equipped with a pump) and warms the oil by conduction. When the engine is stopped, the hot water in the engine surrounding the cylinder walls and in the cylinder head, circulates through the filter water jacket and continues to warm the oil almost as rapidly as when the motor is running. With stop and go driving, this feature of the water jacket is important, and assures operation of the filter for a high per cent. of the time the oil pump is actually running, with viscosities of the oil in the filter suitable for filtration.

A simplified arrangement of the water jacket is shown at Fig. 4, where the filter 46 is mounted in the reservoir of the radiator, at the top where the hot water is located, so that oil within the filter is warmed by the hot water surrounding it. A single-pass filter medium is used in this type of filter, with preferably no orifice within the filter as a constant bleed. The opening 41 could be the inlet and oil from the crankcase forced into the filter from the by-pass from the engine pump. The filter outlet 40 would be connected to the crankcase or to a channel through which oil may be supplied to a moving part.

What is claimed is:

1. A filter comprising a shell having an oil inlet and outlet, filter media disposed in said shell in the path of liquid travel between said inlet and outlet, said filter media being of the surface filtration type, and means for constantly by-passing at a higher rate of flow, the major portion of the unfiltered oil delivered to the shell than that of the oil passing through said media and the cake formed thereon in order to utilize the heat of the by-passed oil to control the viscosity of the oil advanced through said filtering media.

2. A filter comprising a shell having an oil inlet and outlet, filter media disposed in said shell in the path of liquid travel between said inlet and outlet, said filter media being of the paper surface filtration type and when in active use removing by oil passing therethrough at least 80% of solids in a single pass, and means for constantly by-passing at a higher rate of flow, the major portion of the unfiltered oil delivered to the shell than that of the oil passing through said media and the cake formed thereon in order to utilize the heat of the by-passed oil to control the viscosity of the oil advanced through said filtering media.

DONALD H. WELLS.